(12) United States Patent
Miyashita et al.

(10) Patent No.: US 9,567,967 B2
(45) Date of Patent: Feb. 14, 2017

(54) VEHICLE CONTROL APPARATUS, VEHICLE, AND VEHICLE CONTROL METHOD

(71) Applicant: TOYOTA JIDOSHA KABUSHIKI KAISHA, Toyota-shi, Aichi-ken (JP)

(72) Inventors: Michihiro Miyashita, Susono (JP); Tomoharu Maeda, Toyota (JP); Kohei Tochigi, Susono (JP); Tomomi Katsumata, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 94 days.

(21) Appl. No.: 14/710,047

(22) Filed: May 12, 2015

(65) Prior Publication Data

US 2015/0333564 A1 Nov. 19, 2015

(30) Foreign Application Priority Data

May 14, 2014 (JP) .................. 2014-100118

(51) Int. Cl.
*F02N 11/08* (2006.01)
*F02D 28/00* (2006.01)
(Continued)

(52) U.S. Cl.
CPC .......... *F02N 11/0862* (2013.01); *B60W 10/06* (2013.01); *B60W 10/26* (2013.01);
(Continued)

(58) Field of Classification Search
CPC .......... H02J 7/14; H02J 7/1446; H02J 7/1469; H02J 7/16; H02J 7/163; H02J 7/1438; F02D 29/02; F02D 29/06; B60W 10/06; B60W 10/08; B60W 10/24; B60W 10/26; F02N 11/0862; F02N 11/0822; F02N 2200/101; F02N 2200/061; F02N 2200/062; F02N 2200/063; F02N 2300/2011; F02N 2300/2004; F02N 2300/2006

See application file for complete search history.

(56) References Cited

U.S. PATENT DOCUMENTS 5,363,312 A * 11/1994 Ninomiya ............... G06F 1/263
  320/155
5,595,064 A *  1/1997 Ikeda .................. B60H 1/00392
  180/65.1
(Continued)

FOREIGN PATENT DOCUMENTS

EP  2781411 A1  9/2014
JP  2011-163281 A  8/2011
(Continued)

*Primary Examiner* — Hai Huynh
*Assistant Examiner* — Raza Najmuddin
(74) *Attorney, Agent, or Firm* — Sughrue Mion, PLLC

(57) ABSTRACT

An auxiliary current amount that is used in an auxiliary that is mounted in a vehicle is calculated. A stop time ratio of the vehicle is calculated based on a running history of the vehicle, and an estimated stop time of the vehicle that is estimated based on the stop time ratio is calculated. An SOC threshold is set based on an estimated consumption current amount that is obtained from the estimated stop time and the auxiliary current amount. A generator that is mounted in the vehicle is operated such that a value of a storage state of the battery recovers to become larger than the SOC threshold when the value of the storage state of the battery is smaller than the SOC threshold.

5 Claims, 8 Drawing Sheets

(51) Int. Cl.

| | | |
|---|---|---|
| *B60W 20/00* | (2016.01) | |
| *B60W 10/08* | (2006.01) | |
| *F02D 29/02* | (2006.01) | |
| *F02D 29/06* | (2006.01) | |
| *B60W 10/06* | (2006.01) | |
| *B60W 10/26* | (2006.01) | |
| *H02J 7/14* | (2006.01) | |
| *H02P 9/00* | (2006.01) | |

(52) U.S. Cl.
CPC .............. *F02D 29/02* (2013.01); *F02D 29/06* (2013.01); *H02J 7/1438* (2013.01); *H02J 7/1446* (2013.01); *H02P 9/00* (2013.01); *F02N 11/0822* (2013.01); *F02N 2200/061* (2013.01); *F02N 2200/062* (2013.01); *F02N 2200/101* (2013.01); *F02N 2300/2006* (2013.01); *F02N 2300/2011* (2013.01)

(56) References Cited

U.S. PATENT DOCUMENTS

| | | | | |
|---|---|---|---|---|
| 2002/0017261 | A1* | 2/2002 | Kuroda | F02N 11/0825 123/179.4 |
| 2009/0295399 | A1* | 12/2009 | Ueda | B60L 11/1859 324/429 |
| 2010/0070121 | A1* | 3/2010 | Ochiai | B60K 6/48 701/22 |
| 2010/0106390 | A1* | 4/2010 | Yamaguchi | B60W 10/08 701/102 |
| 2010/0217484 | A1* | 8/2010 | Mizuno | F02N 11/0818 701/36 |
| 2013/0124066 | A1* | 5/2013 | Pebley | B60W 10/26 701/102 |
| 2013/0314052 | A1* | 11/2013 | Nomoto | H02J 7/1446 320/155 |
| 2014/0257636 | A1* | 9/2014 | Ueki | F02D 29/02 701/36 |
| 2014/0316628 | A1* | 10/2014 | Miyashita | B60R 16/0236 701/22 |
| 2014/0330473 | A1* | 11/2014 | Miyashita | B60L 7/10 701/22 |
| 2014/0343831 | A1* | 11/2014 | Hosey | B60R 16/03 701/113 |
| 2014/0365099 | A1* | 12/2014 | Tochigi | F02D 17/04 701/99 |
| 2015/0210284 | A1* | 7/2015 | Miyashita | B60W 40/04 701/117 |
| 2015/0292464 | A1* | 10/2015 | Maeda | F02N 11/0825 290/38 E |
| 2015/0349581 | A1* | 12/2015 | Tochigi | H01M 10/48 320/148 |
| 2016/0039370 | A1* | 2/2016 | Suzuki | B60R 16/033 307/10.1 |
| 2016/0046292 | A1* | 2/2016 | Miyashita | F02D 17/02 701/36 |
| 2016/0152155 | A1* | 6/2016 | Miyashita | B60L 11/1861 320/134 |
| 2016/0153417 | A1* | 6/2016 | Tochigi | F02D 17/04 123/339.24 |
| 2016/0167534 | A1* | 6/2016 | Suzuki | B60L 7/10 307/10.1 |
| 2016/0185240 | A1* | 6/2016 | Horitake | B60L 11/1861 307/10.1 |

FOREIGN PATENT DOCUMENTS

| | | |
|---|---|---|
| JP | 2012-42312 A | 3/2012 |
| JP | 2012-186908 A | 9/2012 |
| WO | 2013072976 A1 | 5/2013 |

* cited by examiner

FIG. 5

| NEAR PAST STOP TIME RATIO R1 | 0% | — | 25% | — | ≥50% |
|---|---|---|---|---|---|
| NEAR PAST STOP TIME COEFFICIENT Tr1 | 60sec | — | 90sec | — | 180sec |

| FAR PAST STOP TIME RATIO R2 | 0% | — | 20% | — | ≥40% |
|---|---|---|---|---|---|
| FAR PAST STOP TIME COEFFICIENT Tr2 | 60sec | — | 90sec | — | 180sec |

FIG. 6

| CHANGE IN SOC (180 sec) | ≤-1% | -0.5% | ±0% | +0.5% | ≥+1% |
|---|---|---|---|---|---|
| CORRECTION VALUE (CO) | +1% | +0.5% | ±0% | -0.5% | -1% |

VEHICLE CONTROL APPARATUS, VEHICLE, AND VEHICLE CONTROL METHOD

INCORPORATION BY REFERENCE

The disclosure of Japanese Patent Application No. 2014-100118 filed on May 14, 2014 including the specification, drawings and abstract is incorporated herein by reference in its entirety.

BACKGROUND OF THE INVENTION

1. Field of the Invention

The invention relates to a vehicle control apparatus, a vehicle, and a vehicle control method.

2. Description of Related Art

In recent years, with a view to enhancing the performance of fuel economy of a vehicle, a technology called idling stop for stopping an engine at the time of temporary stop has been prevailing. For example, in Japanese Patent Application Publication No. 2011-163281 (JP 2011-163281 A), there is proposed a technology for rapidly charging a battery immediately before stop, recovering the value of a storage state (an SOC) of the battery to a value equal to or larger than a predetermined threshold (hereinafter referred to also as "an SOC threshold"), increasing the number of opportunities to execute idling stop, and enhancing the performance of fuel economy of the vehicle in the case where the value of the SOC of the battery is smaller than the SOC threshold when the vehicle speed is lower than a predetermined value.

However, according to the technology of Japanese Patent Application Publication No. 2011-163281 (JP 2011-163281 A), the SOC threshold is constant, so there are the following possibilities. For example, when the time for idling stop is long, the storage amount of the battery is insufficient, and idling stop may be forcibly canceled in mid-course. Besides, when the time for idling stop is short, the battery may be charged with a storage amount (referred to also as "an amount of electricity") that is more than necessary to execute idling stop. Then, the presence of these possibilities may result in the insufficient enhancement of the performance of fuel economy. Therefore, technologies allowing the battery to be appropriately charged in accordance with the length of the time of the occurrence of idling stop have been desired.

SUMMARY OF THE INVENTION

The invention can be implemented in the following aspects.

(1) According to one aspect of the invention, there is provided a vehicle control apparatus that is mounted in a vehicle having an engine, a generator that is driven by a power of the engine, a battery that can be charged through electric power generation by the generator, and an auxiliary that operates by an electric power stored in the battery. This vehicle control apparatus is equipped with an auxiliary current amount calculation unit, a stop time ratio calculation unit, a stop time calculation unit, an SOC threshold setting unit, and an electric power generation control unit. The auxiliary current amount calculation unit calculates an auxiliary current amount that is used in the auxiliary. The stop time ratio calculation unit calculates a stop time ratio of the vehicle based on a running history of the vehicle. The stop time calculation unit calculates an estimated stop time of the vehicle that is estimated based on the stop time ratio. The SOC threshold setting unit sets an SOC threshold based on an estimated consumption current amount that is obtained from the estimated stop time and the auxiliary current amount. The electric power generation control unit operates the generator such that a value of a storage state of the battery recovers to become larger than the SOC threshold when the value of the storage state of the battery is smaller than the SOC threshold. According to this vehicle control apparatus, the SOC threshold can be variably set based on the estimated consumption current amount that is obtained from the estimated stop time and the auxiliary current. Therefore, the storage amount of the battery needed to execute idling stop can be ensured in an appropriate state, and the battery can be restrained from being charged beyond necessity. Therefore, the performance of fuel economy can be enhanced.

(2) In the vehicle control apparatus according to the aforementioned aspect of the invention, the threshold setting unit may make a comparison between the value of the storage state of the battery at the time of setting the SOC threshold and the value of the storage state of the battery that is obtained a certain time before the present, and correct the SOC threshold with a correction amount corresponding to a result of the comparison based on a relationship prepared in advance between a change in the value of the storage state of the battery and the correction amount. The vehicle control apparatus according to this aspect of the invention makes it possible to cause the threshold to reflect time-dependent fluctuations.

(3) In the vehicle control apparatus according to the aforementioned aspect of the invention, the stop time ratio calculation unit may sequentially calculate, after a lapse of a first time from a starting point that is a predetermined timing, as a first stop time ratio, a ratio of a stop time in a period of the first time in the past, based on a running history of the vehicle, the stop time ratio calculation unit may sequentially calculate, after a lapse of a second time from the starting point, as a second stop time ratio, a ratio of a stop time to a period of the second time in the past that is longer than the first time, the stop time calculation unit may obtain a first estimated stop time corresponding to the first stop time ratio that is calculated by the stop time ratio calculation unit, based on a relationship prepared in advance between the first stop time ratio and the first estimated stop time, and the stop time calculation unit may obtain a second estimated stop time corresponding to the second stop time ratio that is calculated by the stop time ratio calculation unit, based on a relationship prepared in advance between the second stop ratio and the second estimated stop time, and set a longer one of the obtained first estimated stop time and the obtained second estimated stop time as the estimated stop time. The vehicle control apparatus according to this aspect of the invention makes it possible to enhance the accuracy in estimating the stop time, and to enhance the accuracy in setting the threshold.

Incidentally, the invention can be implemented in various aspects. For example, the invention can be implemented in an aspect of a vehicle that is equipped with the vehicle control apparatus according to the aspect of the invention, a vehicle control method for causing a computer to realize functions corresponding to respective units of the vehicle control apparatus according to the aspect of the invention, and the like.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein:

FIG. 5 is an illustrative view showing examples of maps showing a relationship between a stop time ratio and a stop time coefficient;

FIG. 6 is an illustrative view showing an example of a correction value map showing a relationship between a change in SOC and a correction value;

DETAILED DESCRIPTION OF EMBODIMENT

Figure 1:
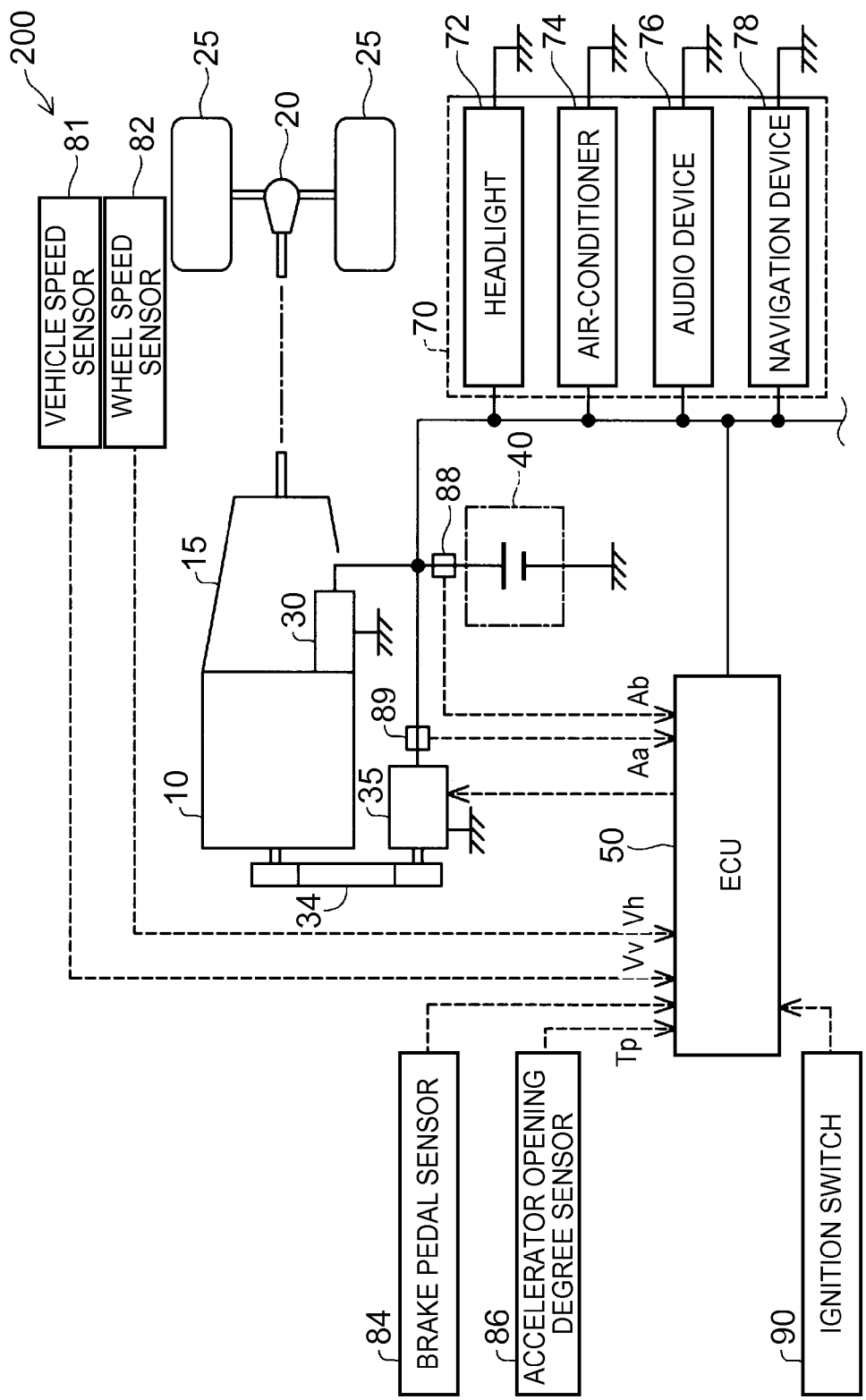
FIG. 1 is an illustrative view showing the configuration of a motor vehicle as the embodiment of the invention.

FIG. 1 is an illustrative view showing the configuration of a motor vehicle 200 as one embodiment of the invention. The motor vehicle 200 is a vehicle that is endowed with an idling stop function for an engine. The motor vehicle 200 is equipped with an engine 10, an automatic transmission 15, a differential gear 20, driving wheels 25, a starter 30, an alternator 35, a battery 40, and an electrical control unit (an ECU) 50.

The engine 10 is an internal combustion engine that generates a power by burning a fuel such as gasoline, light oil or the like. The power of the engine 10 is transmitted to the automatic transmission 15, and is transmitted to the alternator 35 via a drive mechanism 34. The output of the engine 10 is changed by an engine control computer (not shown) in accordance with the depression amount of an accelerator pedal (not shown) that is operated by a driver.

The automatic transmission 15 automatically changes the speed ratio (makes a so-called shift change). The power (the rotational speed/the torque) of the engine 10 is changed in speed by the automatic transmission 15, and is transmitted to the right and left driving wheels 25 via a differential gear 20 as a desired rotational speed/a desired torque. In this manner, the power of the engine 10 is transmitted to the driving wheels 25 via the automatic transmission 15 while being changed in accordance with the depression amount of the accelerator pedal. Thus, the vehicle (the motor vehicle 200) is accelerated/decelerated.

The drive mechanism 34 that transmits the power of the engine 10 to the alternator 35 adopts a belt drive configuration in the present embodiment of the invention. The alternator 35 generates electric power using part of the power of the engine 10. The alternator 35 is a kind of generator. The generated electric power is used to charge the battery 40 via an inverter (not shown). Incidentally, in the present specification, electric power generation by the power of the engine 10 with the aid of the alternator 35 is referred to as "fuel electric power generation".

The battery 40 is a lead storage battery as a DC power supply with a voltage of 12 V, and supplies an electric power to a peripheral device that is not provided in an engine body. In the present specification, a peripheral device that is not provided in the engine body and that operates using the electric power stored in the battery 40 is referred to as "an auxiliary". A group of auxiliaries is referred to as "an auxiliary group". The motor vehicle 200 is equipped with a headlight 72, an air-conditioner 74, an audio device 76, a navigation device 78, and the like, as an auxiliary group 70.

The starter 30 is a cell motor that starts the engine 10 by an electric power that is supplied from the battery 40. Normally, when the driver operates an ignition switch (not shown) in starting to drive the stopped motor vehicle, the starter 30 is activated, and the engine 10 is started. This starter 30 is also utilized when the engine 10 is restarted from a stopped state thereof through idling stop control.

The ECU 50 is configured as a computer that is equipped with a CPU that executes a computer program, a ROM that stores the computer program and the like, a RAM that temporarily stores data, input/output ports that are connected to various sensors, actuators, etc., and the like. As the sensors that are connected to the ECU 50, a vehicle speed sensor 81 that detects a vehicle speed, a wheel speed sensor 82 that detects a rotational speed of the driving wheels 25, a brake pedal sensor 84 that detects whether or not a brake pedal (not shown) is depressed, an accelerator opening degree sensor 86 that detects a depression amount of the accelerator pedal (not shown) as an accelerator opening degree, a battery current sensor 88 that detects a charging/discharging current of the battery 40, an alternator current sensor 89 that detects an output current of the alternator 35 (an alternator current), and the like are provided. The starter 30, the alternator 35, and the like correspond to the actuators. The ECU 50 is supplied with the electric power from the battery 40.

The ECU 50 controls the starter 30 and the alternator 35 based on respective signals from the various sensors and the engine control computer (not shown), thus controlling stop and restart of the engine (idling stop control) and controlling the storage state (the state of charge or the SOC) of the battery 40. "The SOC" is defined as a value that is obtained by dividing the amount of electricity remaining in the battery 40 by the amount of electricity that is stored when the battery is fully charged. Incidentally, the SOC is also referred to as a remaining capacity. According to idling stop control, when a wheel speed Vh detected by the wheel speed sensor 82 drops below a predetermined speed (e.g., 10 km/h), it is determined that an engine stop condition has been fulfilled, and a fuel cutoff command is output to a fuel supply system, and then, when depression of the accelerator pedal is detected from an accelerator opening degree Tp, it is determined that an engine restart condition has been fulfilled, and an engine restart command is output to the starter 30. The ECU 50 functions as the vehicle control apparatus according to the invention.

Figure 2:
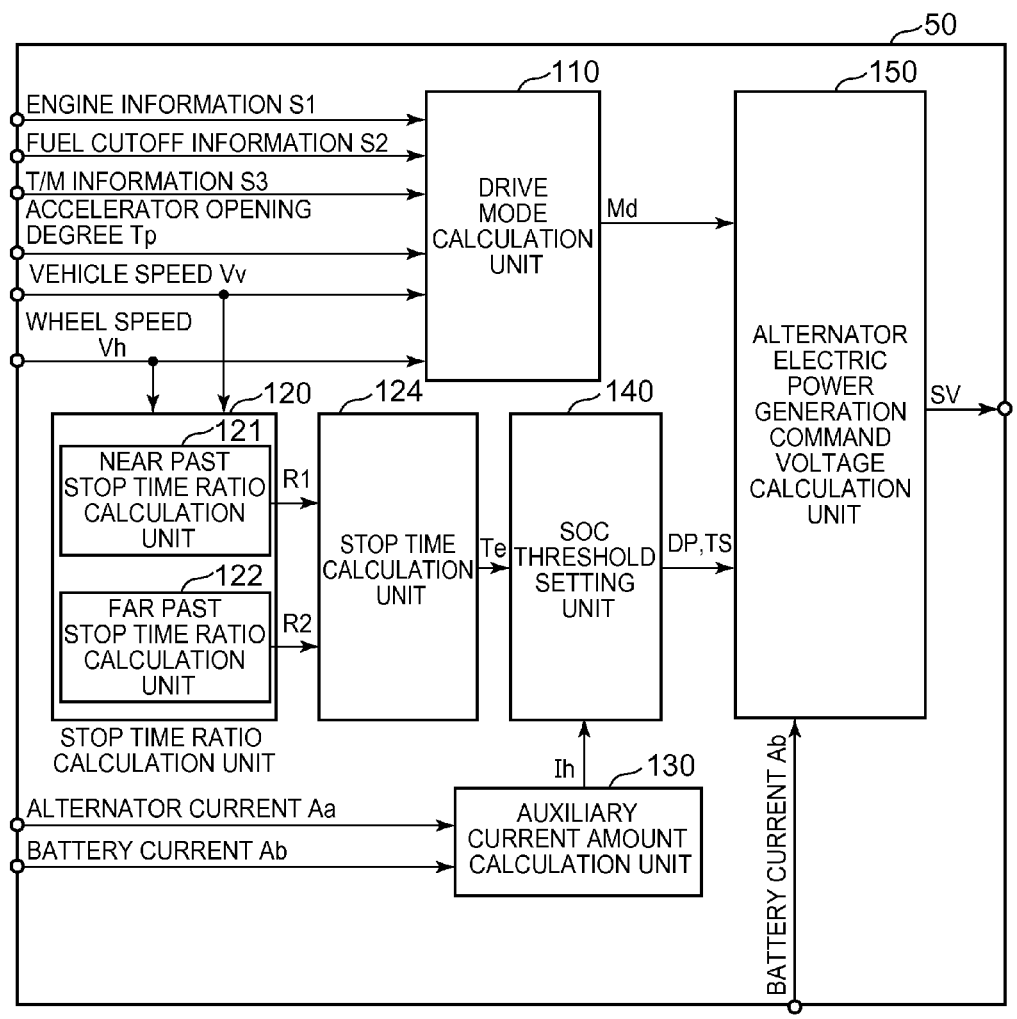
FIG. 2 is an illustrative view functionally showing part of the configuration of an ECU.

FIG. 2 is an illustrative view functionally showing part of the configuration of the ECU 50. The diagrammatic representation shows a configuration for controlling the SOC of the battery 40. The ECU 50 is equipped with a drive mode calculation unit 110, a stop time ratio calculation unit 120, a stop time calculation unit 124, an auxiliary current amount calculation unit 130, an SOC threshold setting unit 140, and an alternator electric power generation command voltage calculation unit 150. The respective units 110 to 150 actually indicate the functions that are realized when the CPU with which the ECU 50 is equipped executes the computer program stored in the ROM.

The drive mode calculation unit 110 calculates a drive mode based on engine information S1 such as an accelerator opening degree and the like as transmitted from the engine control computer (not shown), fuel cutoff information S2 indicating stop of fuel injection as transmitted also from the engine control computer, transmission (T/M) information S3 indicating a shift range of the automatic transmission 15, a vehicle speed Vv detected by the vehicle speed sensor 81, and the wheel speed Vh detected by the wheel speed sensor 82. It should be noted herein that "the drive mode" indicates a running state of the motor vehicle 200, and has three modes, namely, a constant-speed running mode, an acceleration running mode, and a deceleration running mode. The drive mode calculation unit 110 calculates which one of the aforementioned three modes is established, and transmits a result of the calculation to the alternator electric power generation command voltage calculation unit 150 as a drive mode Md.

The stop time ratio calculation unit 120 calculates a ratio of a stop time to a predetermined period, based on the vehicle speed Vv detected by the vehicle speed sensor 81 as an element of a running history of the motor vehicle, and the wheel speed Vh detected by the wheel speed sensor 82. In the present example, the stop time ratio calculation unit 120 is equipped with two units, there is a difference of length of the predetermined period between two units, namely, a near past stop time ratio calculation unit 121 and a far past stop time ratio calculation unit 122. The near past stop time ratio calculation unit 121 calculates, for example, a ratio R1 of a stop time of the vehicle to a short period such as X minutes in the past (hereinafter referred to as "a near past stop time ratio"). The far past stop time ratio calculation unit 122 calculates, for example, a ratio R2 of a stop time of the vehicle to a long period such as Y minutes (Y>X) in the past (hereinafter referred to as "a far past stop time ratio"). Incidentally, the near past stop time ratio calculation unit 121 functions as the first stop time ratio calculation unit of the invention, and the far past stop time ratio calculation unit 122 functions as the second stop time ratio calculation unit of the invention. Besides, X minutes is corresponding to the first time of the invention, and X minutes in the past is corresponding to a period of the first time in the past of the invention. Besides, Y minutes is corresponding to the second time of the invention, and Y minutes in the past is corresponding to a period of the second time in the past of the invention. Incidentally, in the present example, X=10 and Y=15. Besides, the near past stop time ratio R1 is corresponding to the first stop time ratio of the invention, and the far past stop time ratio R2 is corresponding to the second stop time ratio of the invention.

The stop time calculation unit 124 calculates a stop time estimated at the time of next stop (referred to as "an estimated stop time") Te based on the respective stop time ratios R1 and R2 calculated by the stop time ratio calculation unit 120. Incidentally, the processes by the stop time ratio calculation unit 120 and the stop time calculation unit 124 will be described later in detail.

The auxiliary current amount calculation unit 130 calculates an auxiliary current amount Ih consumed in the auxiliary group 70, based on an alternator current Aa detected by the alternator current sensor 89 and a charging/discharging current of the battery 40 (referred to as "a battery current") Ab detected by the battery current sensor 88.

The SOC threshold setting unit 140 sets an SOC threshold DP and an SOC target value TS based on the estimated stop time Te and the auxiliary current amount Ih. The alternator electric power generation command voltage calculation unit 150 calculates a voltage value (an electric power generation command voltage) SV for commanding the alternator 35 to generate an electric power generation amount, based on the SOC threshold DP set by the SOC threshold setting unit 140, the SOC target value TS, the drive mode Md calculated by the drive mode calculation unit 110, and the battery current Ab detected by the battery current sensor 88 (FIG. 1). The alternator 35 (FIG. 1) generates an electric power at the electric power generation command voltage SV calculated by the alternator electric power generation command voltage calculation unit 150. This alternator electric power generation command voltage calculation unit 150 functions as the electric power generation control unit of the invention.

It should be noted herein that the SOC threshold DP is a value indicating a certain SOC of the battery 40, and is a value for determining whether or not the electric power generation operation state of the alternator 35 should be set to a rapid charging operation state for recovering the SOC of the battery 40. For example, when the SOC of the battery 40 is lower than the SOC threshold DP, the amount of electricity for idling stop is estimated to become insufficient at the time of next stop. Then, in this case, the alternator electric power generation command voltage calculation unit 150 is operated to execute rapid charging battery control such that the electric power generation operation state of the alternator 35 becomes the rapid charging operation (referred to also as "recovery charging operation") state. Specifically, when the drive mode Md is the constant-speed running mode or the acceleration running mode in a state where the SOC of the battery 40 should be subjected to rapid charging operation, the electric power generation command voltage SV indicating a voltage value for rapid charging is output from the alternator electric power generation command voltage calculation unit 150, as will be described later. Thus, fuel electric power generation by the alternator 35 is controlled to constant-voltage electric power generation, and rapid charging of the battery 40 is carried out. Incidentally, when the drive mode Md is the deceleration running mode, the electric power generation command voltage SV indicating a voltage value for regenerative charging is output from the alternator electric power generation command voltage calculation unit 150. Thus, electric power generation by the alternator 35 is controlled to regenerative electric power generation instead of being controlled to fuel electric power generation, so the battery 40 can be charged with the electricity generated through regeneration. Incidentally, this regenerative electric power generation control is a control process for charging the battery through regenerative electric power generation during deceleration running. Therefore, the battery 40 can be restrained from being charged through fuel electric power generation during normal running, so the amount of fuel consumption can be saved.

In contrast, when the remaining capacity of the battery 40 has exceeded the SOC threshold DP, the execution of idling stop is estimated to be possible at the time of next stop. Therefore, it can be determined that rapid charging operation (recovery charging operation) is unnecessary. Thus, in this case, the alternator electric power generation command voltage calculation unit 150 is operated in accordance with the state of fluctuations in the SOC of the battery 40 such that the electric power generation operation state of the alternator 35 becomes a normal operation ("normal charging operation") state, and normal charging battery control is executed. Specifically, when the drive mode Md is the constant-speed running mode in a state where the SOC of the battery 40 should be subjected to normal charging operation, FB electric power generation control for controlling the electric power generation command voltage SV through feedback in accordance with the state of fluctuations in the SOC of the battery 40 is executed, and the battery 40 is charged such that the SOC of the battery 40 is held equal to the SOC target value TS. Incidentally, when the drive mode Md is the deceleration running mode, regenerative electric power generation control is executed instead of FB electric power generation control, so the battery 40 can be charged with the electricity generated through regeneration. Besides, when the drive mode Md is the acceleration running mode, higher priority is given to acceleration operation, and electric power generation by the alternator 35 is stopped or suppressed. Incidentally, FB electric power generation control will be further described later.

The alternator 35 is rotated using part of the power of the engine 10, so electric power generation during running leads to an increase in the amount of fuel consumption. It should be noted herein that when the SOC drops to an idling stop prohibition threshold in the course of engine stop through idling stop control, idling stop control is stopped to restart the engine due to insufficiency in the SOC. The amount of fuel that is three to almost five times as large as in the case where the power of the engine is increased to increase the SOC during operation of the engine is required for restarting the engine. In other words, the effect of fuel economy per unit SOC (e.g., SOC 1%) during operation of the engine is three to five times as excellent as in the case where the engine is restarted due to an insufficiency in the SOC in the course of engine stop. Accordingly, in the alternator electric power generation command voltage calculation unit 150, as described above, the electric power generation command voltage SV is controlled in accordance with the drive mode Md and the SOC threshold DP, so the number of opportunities to restart the engine is reduced due to an insufficiency in the SOC in the course of engine stop by idling stop control, thus making an improvement in fuel economy. In particular, according to the present embodiment of the invention, as will be described hereinafter, an estimated consumption current amount that is estimated to be consumed during idling stop at the time of next stop (referred to also as "a predicted consumption current amount" or "an estimated (predicted) consumption electricity amount") is obtained from an estimated stop time or an auxiliary current amount, and the SOC threshold is fluctuated in accordance with the change in the obtained estimated consumption current amount. Thus, the battery is restrained from being charged beyond a necessary amount of electricity or, the battery is restrained from being in the case where the estimated consumption electricity amount cannot be compensated for with the remaining capacity of the battery, thus making an improvement in fuel economy.

Figure 3:
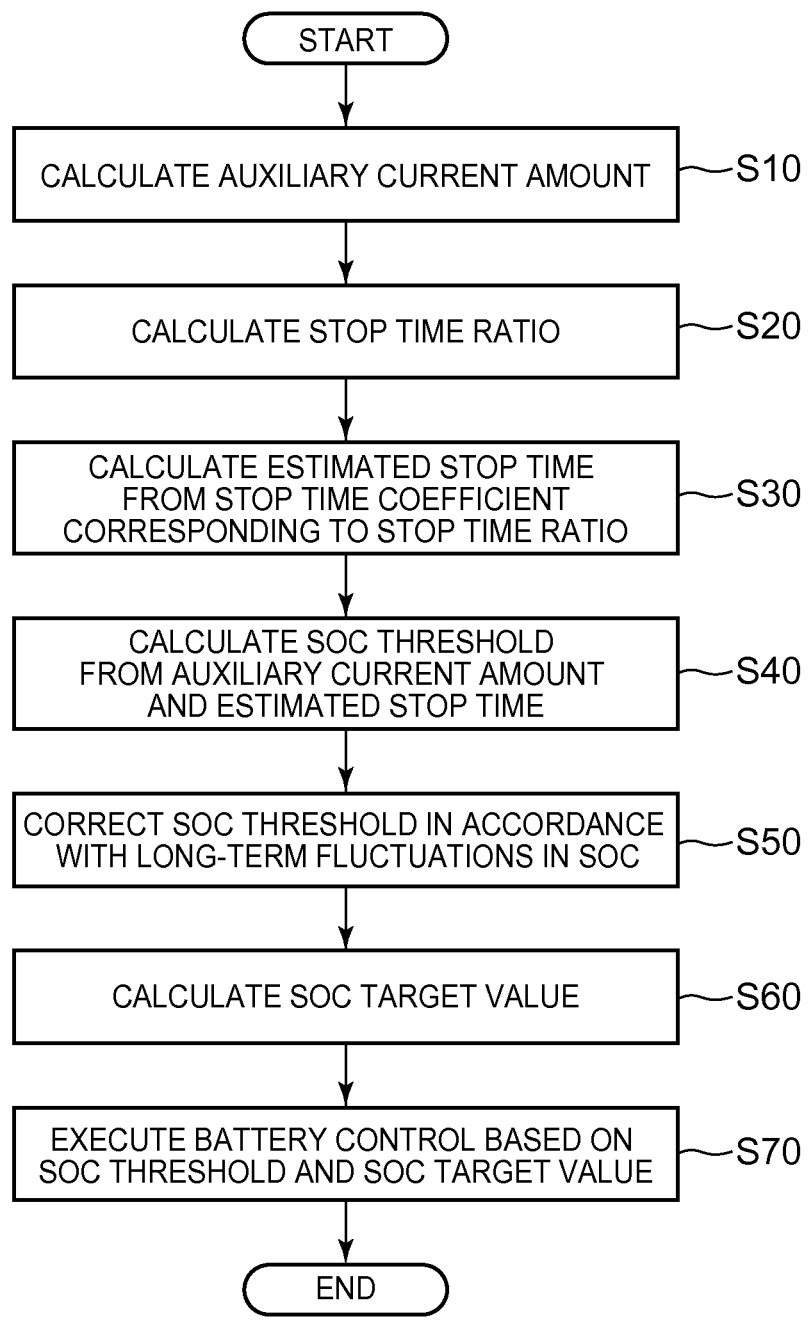
FIG. 3 is a flowchart showing a battery control routine.

FIG. 3 is a flowchart showing a battery control routine. This battery control routine is repeatedly started to be executed in the ECU 50 from a timing when the engine 10 is started after activation of the starter 30 through operation of an ignition switch (not shown) by the driver to a timing when the engine 10 is stopped through operation of the ignition switch by the driver.

When the process is started, the auxiliary current amount calculation unit 130 of the ECU 50 calculates the auxiliary current amount Ih in step S10. The auxiliary current amount can be obtained by, for example, subjecting a current value that is obtained by subtracting the battery current Ab from the alternator current Aa to a smoothing process for a smoothing time of 15 seconds. It should be noted, however, that it is preferable to stop calculation and retain the last value for a predetermined time (e.g., for one second) in activating the starter 30, in order to exclude a cranking current in activating the starter 30. Incidentally, the method of calculating the auxiliary current amount should not be limited to the smoothing process. The auxiliary current amount can be calculated through the use of various general smoothing processes.

In step S20, the stop time ratio calculation unit 120 of the ECU 50 calculates a stop time ratio. Specifically, the near past stop time ratio calculation unit 121 calculates the near past stop time ratio R1, and the far past stop time ratio calculation unit 122 calculates the far past stop time ratio R2. The near past stop time ratio R1 is a ratio of a stop time to a total time consisting of a running time and the stop time for X minutes (X=10 in the present example) in the past. The near past stop time ratio R1 is set as an initial value before the first lapse of X minutes, and is sequentially calculated and updated on a real-time basis after the lapse of X minutes. As is the case with the near past stop time ratio R1, the far past stop time ratio R2 is also a ratio of a stop time to a total time consisting of a running time and the stop time for Y minutes (Y=15 in the present example) in the past. The far past stop time ratio R2 is set as an initial value before the first lapse of Y minutes, and is sequentially calculated and updated on a real-time basis after the lapse of Y minutes. Incidentally, X=10 and Y=15 according to one example, but the invention should not be limited thereto. Various time lengths having a relationship of X<Y can be applied.

For example, the near past stop time ratio calculation unit 121 can calculate the near past stop time ratio R1 as will be described hereinafter. First of all, after the engine is started in response to operation of the ignition switch (not shown) by the driver, the near past stop time ratio calculation unit 121 determines whether or not the vehicle speed Vv of the motor vehicle 200 is higher than a predetermined speed V0 (e.g., 15 km/h), and starts executing a stop time acquisition routine for acquiring a stop time at a starting point when the vehicle speed Vv becomes higher than the predetermined speed V0. The stop time acquisition routine is designed to obtain, at intervals of, for example, 60 seconds, a stop time during those 60 seconds, and to sequentially store the obtained result into stack elements with which a first storage stack is equipped.

Figure 4:
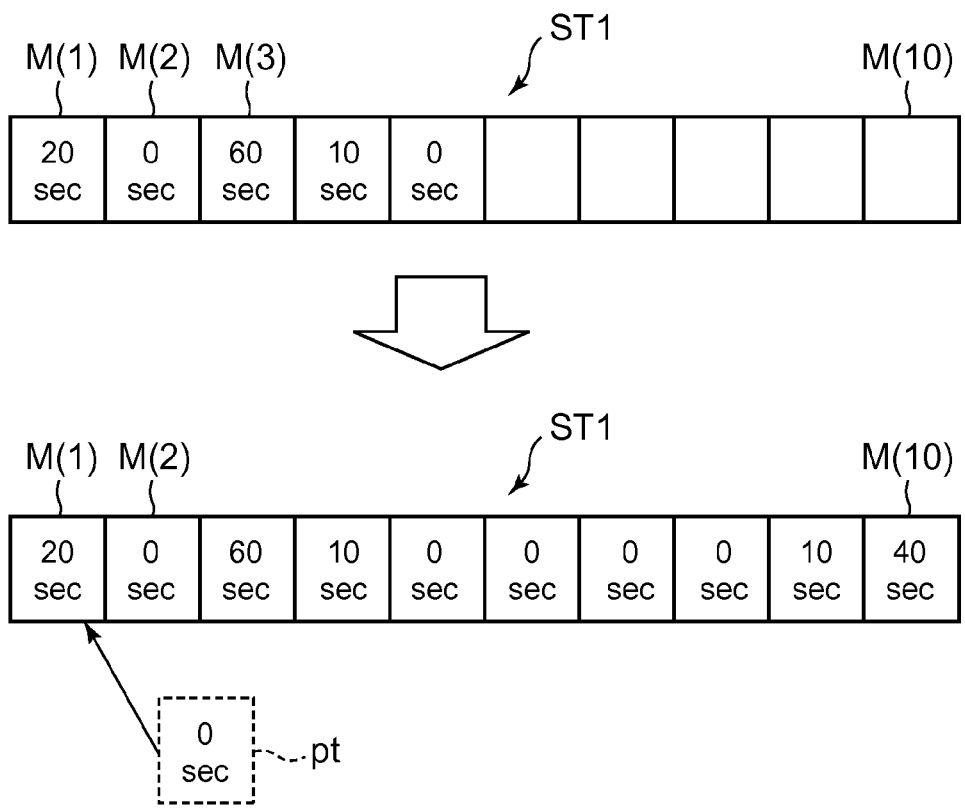
FIG. 4 is an illustrative view showing an example of storage stacks that are used to calculate a near past stop time ratio.

FIG. 4 is an illustrative view showing an example of a storage stack ST1 that is used to calculate the near past stop time ratio R1. As indicated by the storage stack ST1 on the upper side of FIG. 4, the storage stack ST1 is constituted of 10 stack elements M(1), M(2), ..., and M(10). The near past stop time ratio calculation unit 121 obtains, at intervals of 60 seconds, a stop time during those 60 seconds, and sequentially stores the obtained result into the stack elements M(1), M(2), ..., and M(10) with which the storage stack ST1 is equipped. The stored stack elements sequentially move from M(1) toward M(10). The stop time is calculated by determining, based on the wheel speed Vh detected by the wheel speed sensor 82, whether or not the vehicle is stopped (Vh=0 km/h), and measuring the time when the vehicle is stopped over 60 seconds. Incidentally, a configuration in which a detected value of a vehicle speed sensor (not shown) is used or the like can also be adopted instead of the configuration in which the detected value of the wheel speed sensor 82 is used, in order to determine whether or not the vehicle is stopped.

That is, the stop time acquisition routine is designed to sequentially obtain, at intervals of 60 seconds, a stop time during those 60 seconds, and to sequentially store the obtained stop time into the stack elements M(1) to M(10) one by one. According to the example shown in the drawing, a stop time of 20 seconds is stored into the stack element M(1) upon the lapse of 60 seconds, a stop time of 0 seconds is stored into the stack element M(2) upon the lapse of 120 seconds, and a stop time of 60 seconds is stored into the stack element M(3) upon the lapse of 180 seconds. In this manner, the stop time is sequentially stored at intervals of 60 seconds. As indicated by the storage stack ST1 on the lower side of FIG. 4, when each of the first to last stack elements M(1) to M(10) is filled with the stop time, namely, when a total of 10 minutes (600 seconds) has elapsed, a stop time pt obtained on a subsequent cycle is stored into the first stack element M(1). At this time, the values stored so far are retained in the stack elements M(2) to M(10). A stop time (not shown) obtained on a subsequent cycle is stored into the second stack element M(2). In this manner, when all the stack elements M(10) are filled up, a return is made to the first stack element, and the stack elements are updated one by one therefrom.

The near past stop time ratio calculation unit 121 of FIG. 2 executes a stop time ratio calculation routine in addition to the stop time acquisition routine. The stop time ratio calculation routine starts to be executed upon the lapse of a time required for filling up the stack elements M(1) to M(10) of the storage stack ST1, namely, 600 seconds (=10 minutes) from the starting point. The stop time ratio calculation routine is designed to obtain a sum of the respective values stored in the stack elements M(1) to M(10), to divide the obtained sum by 600 seconds as the time required for filling up the storage stack ST1, and to set the quotient as the near past stop time ratio R1. In the storage stack ST1, the stack elements M are updated one by one at intervals of 60 seconds, so the near past stop time ratio R1 is obtained every time this update is carried out. That is, according to the stop time ratio calculation routine, the contents stored in the storage stack ST1 are used to make it possible to obtain the ratio of the stop time to the period of 600 seconds (=10 minutes) in the immediate past one after another as the near past stop time ratio R1 at intervals of 60 seconds. The ratio of the stop time is a ratio of the stop time to the total time (600 seconds in this case).

As is the near past stop time ratio calculation unit 121, the far past stop time ratio calculation unit 122 can also calculate the far past stop time ratio R2 by executing a stop time acquisition routine and a stop time ratio calculation routine. It should be noted, however, that the stop time acquisition routine and the stop time ratio calculation routine in the far past stop time ratio calculation unit 122 are specific to the far past stop time ratio calculation unit 122. The stop time acquisition routine of the far past stop time ratio calculation unit 122 is designed to sequentially obtain a stop time in a period of 90 seconds from attainment of the aforementioned starting point at intervals of 90 seconds, and to sequentially store the obtained stop time into stack elements N(1) to N(10) with which storage stacks specific to the far past stop time ratio calculation unit 122 is equipped, one by one. Incidentally, the stack elements N(1) to N(10) are not shown in the drawing but accompanied by the reference symbol "N" in the sense that they are different from M(1) to M(10) respectively. The stop time acquisition routine of the far past stop time ratio calculation unit 122 is designed to obtain a sum of the respective values stored in the stack elements N(1) to N(10) upon the lapse of 900 seconds (=15 minutes) from the aforementioned starting point, to divide the obtained sum by 900 seconds as a time required for filling up the storage stacks, and to set the quotient as the far past stop time ratio R2.

The stop time ratio calculation routine in the near past stop time ratio calculation unit 121 and the stop time ratio calculation routine in the far past stop time ratio calculation unit 122 are continuously executed until the engine is stopped in response to the driver's operation of turning off the ignition switch (not shown).

In step S30 of FIG. 3, the stop time calculation unit 124 of the ECU 50 obtains a stop time coefficient Tr (a near past stop time coefficient Tr1 and a far past stop time coefficient Tr2) corresponding to a stop time ratio (a near past stop time ratio R1 and a far past stop time ratio R2) obtained in step S20, and calculates the estimated stop time Te corresponding to the obtained stop time coefficient Tr. For example, as will be described later, the estimated stop time Te corresponding to the obtained stop time coefficient Tr can be calculated by obtaining the near past stop time coefficient Tr1 and the far past stop time coefficient Tr2 with reference to a map prepared in advance, setting the larger one of them as the stop time coefficient Tr, and adopting the obtained stop time coefficient Tr as the estimated stop time Te. Incidentally, the near past stop time coefficient Tr1 functions as the first estimated stop time of the invention, and the far past stop time coefficient Tr2 functions as the second estimated stop time of the invention.

FIG. 5 is an illustrative view showing examples of maps showing a relationship between the stop time ratio and the stop time coefficient. The upper table of FIG. 5 is an example of a near past stop time coefficient map showing a relationship between the near past stop time ratio R1 and the near past stop time coefficient Tr1. The lower table of FIG. 5 is an example of a far past stop time coefficient map showing a relationship between the far past stop time ratio R2 and the far past stop time coefficient Tr2. As indicated by the upper table of FIG. 5, the near past stop time coefficient map associates the near past stop time coefficient Tr1 with 60 seconds when the near past stop time coefficient R1 is 0%, associates the near past stop time coefficient Tr1 with 90 seconds when the near past stop time ratio R1 is 25%, and associates the near past stop time coefficient Tr1 with 180 seconds when the near past stop time ratio R1 is equal to or higher than 50%. Then, while 0%<R1<25%, the value between 60 seconds and 90 seconds is set in an associated manner so as to increase in proportion to the magnitude of the near past stop time ratio R1 or gradually increase (not shown). While 25%<R1<50% as well, the value between 90 seconds and 180 seconds is set in an associated manner so as to increase in proportion to the magnitude of the near past stop time ratio R1 or gradually increase (not shown). Besides, as indicated by the lower table of FIG. 5, as is the case with the near past stop time coefficient map in the upper table of FIG. 5, the far past stop time coefficient map also associates the far past stop time coefficient Tr2 with 60 seconds when the far past stop time ratio R2 is 0%, associates the far past stop time coefficient Tr2 with 90 seconds when the far past stop time coefficient R2 is 20%, and associates the far past stop time coefficient Tr2 with 180 seconds when the far past stop time ratio R2 is equal to or higher than 40%. Then, while 0%<R2<20%, the value between 60 seconds and 90 seconds is set in an associated manner so as to increase in proportion to the magnitude of the far past stop time ratio R2 or gradually increase (not shown). While 20%<R2<40% as well, the value between 90 seconds and 180 seconds is set in an associated manner so as to increase in proportion to the magnitude of the far past stop time ratio R2 or gradually increase (not shown).

The near past stop time coefficient Tr1 corresponding to the near past stop time ratio R1 obtained in step S20 can be obtained with reference to the near past stop time coefficient map (the upper table of FIG. 5), and the far past stop time coefficient Tr2 corresponding to the far past stop time ratio R2 can be obtained with reference to the far past stop time coefficient map (FIG. 5). Incidentally, the stop time coefficient map shown in FIG. 5 is an example, and the invention should not be limited thereto. The stop time coefficient map can be appropriately set in accordance with the environment or the like.

Then, the estimated stop time Te corresponding to the obtained stop time coefficient Tr can be calculated by setting the longer one of the obtained near past stop time coefficient Tr1 and the obtained far past stop time coefficient Tr2 as the stop time coefficient Tr and adopting this stop time coefficient Tr as the estimated stop time Te. For example, in the case where the near past stop time ratio R1 is 25% and the near past stop time coefficient Tr1 is 90 seconds and where the far past stop time ratio R2 is 40% and the far past stop time coefficient Tr2 is 180 seconds, the far past stop time coefficient Tr2 is adopted as the stop time coefficient Tr, and the estimated stop time Te is set as Tr2=180 seconds.

Incidentally, the initial value of the aforementioned near past stop time ratio and the initial value of the aforementioned far past stop time ratio are preferably set in consideration of the following reason. That is, when the initial value of the far past stop time ratio is set high, the influence of the initial value lasts for a long time (15 minutes in the present example). Therefore, start in an urban district is coped with by setting the initial value of the near past stop time ratio, whose influence lasts for a relatively short time (10 minutes in the present example), high. In the present example, the initial value of the near past stop time ratio R1 is 50%, and the initial value of the far past stop time ratio R2 is 20%. It should be noted, however, that the invention should not be limited to these values, and that the initial values can be appropriately set in accordance with the environment or the like.

In step S40 of FIG. 3, the SOC threshold setting unit 140 of the ECU 50 calculates the SOC threshold DP based on the auxiliary current amount Ih obtained in step S10 and the estimated stop time Te obtained in step S30. Specifically, during execution of idling stop, an estimated consumption current amount (an estimated consumption electricity amount) PR that is discharged from the battery 40 and estimated to be consumed by the auxiliary group 70 is obtained according to an expression (1) shown below, and the obtained estimated consumption current amount PR is converted into an SOC of the battery 40 according to an expression (2) shown below, thus obtaining the SOC threshold DP.

$$PR(As)=Ih(A) \times Te(sec) \qquad (1)$$

$$DP(\%)=SS(\%)+(PR/(5 \text{ hour ratio capacity}/100))(\%) \qquad (2)$$

It should be noted herein that the available SOC range (hereinafter referred to as "an operational SOC range") of the battery 40, especially the lead battery of the present embodiment of the invention is set in advance, for example, within a range from a lower limit of 82% to an upper limit of 90%, due to demands for the prolongation of life. Incidentally, in the following description, the operational SOC range is indicated as 0% to 8%, with the lower limit being 0% as a reference and the upper limit being 8%. Therefore, the aforementioned SOC threshold DP is also indicated as a value with respect to the reference (0%). The first term SS of the aforementioned expression (2) indicates an idling stop prohibition threshold, and is set to 0.2% in the present example. This idling stop prohibition threshold SS is a threshold for prohibiting idling stop such that the SOC of the battery 40 does not further drop after having dropped to SS(%), so as to prevent the SOC from becoming smaller than the lower limit of the operational SOC range. The second term of the aforementioned expression (2) indicates a value that is obtained by converting the estimated consumption current amount PR into the SOC of the battery 40 on the assumption that the state where the SOC is 100% is equal to the 5 hour ratio capacity of the battery.

Then, in step S50, the SOC threshold setting unit 140 corrects the SOC threshold DP in accordance with long-term fluctuations in the SOC. For example, the SOC that is obtained a certain time (e.g., 180 seconds) before the present and the current SOC are compared with each other at intervals of a certain time (e.g., 10 seconds), and the SOC threshold DP is corrected with a correction value CO corresponding to an increase/decrease in the SOC. Specifically, the correction value CO corresponding to the change in the SOC is obtained with reference to a correction value map that is prepared in advance to show a relationship between the change in the SOC and the correction value CO, and is corrected according to an expression (3) shown below.

$$DP(\%)=SS(\%)+(PR/(5 \text{ hour ratio capacity}/100))(\%)+ CO(\%) \qquad (3)$$

FIG. 6 is an illustrative view showing an example of a correction value map showing a relationship between the change in the SOC and the correction value. As shown in FIG. 6, when the change in the SOC tends to decrease, the correction value (the correction amount) CO tending to increase is set to compensate for that tendency, and when the change in the SOC tends to increase, the correction value CO tending to decrease is set to compensate for that tendency.

The SOC threshold DP can be caused to reflect the acceptability of charging of the battery that differs depending on, for example, the temperature of the battery, a deterioration in the battery, the size of the battery or the like. Thus, the map showing the relationship between the stop time ratio and the stop time coefficient as shown in FIG. 5 is not required to be prepared in accordance with the aforementioned difference, and can be used without adaptation. Besides, long-term fluctuations in the SOC can be subjected to feedback, so the stability of various measured values such as the integrated value of a later-described charging/discharging current and the like can be enhanced.

Incidentally, the correction value map shown in FIG. 6 is an example, and the invention should not be limited thereto. The correction value map can be appropriately set in accordance with the environment or the like. The process by step S50 is corresponding to making a comparison between a value of the storage state of the battery at the time of setting the SOC threshold and a value of the storage state of the battery that is obtained a certain time before the present, and correcting the threshold with a correction amount corresponding to a result of the comparison based on a relationship that is prepared in advance between the change in the value of the storage state of the battery and the correction amount, according to the invention.

In step S60 of FIG. 3, the SOC threshold setting unit 140 obtains the SOC target value TS that is utilized in the aforementioned normal charging operation, based on the SOC threshold DP obtained in step S50. As indicated by an expression (4) shown below, the SOC target value TS is a value that is obtained by adding a margin Th (%) (e.g., 0.5%), which is taken into account to prevent the SOC of the battery 40 from becoming equal to or smaller than the SOC threshold DP, to the SOC threshold DP (the expression (3)).

$$TS(\%)=DP(\%)+Th(\%) \qquad (4)$$

In step S70 of FIG. 3, battery control for rapid charging or normal charging is executed in accordance with the SOC of the battery 40, based on the SOC threshold DP obtained as described above. In battery control for normal charging, battery control through FB electric power generation control based on the obtained SOC target value TS is executed in particular.

Figure 7:
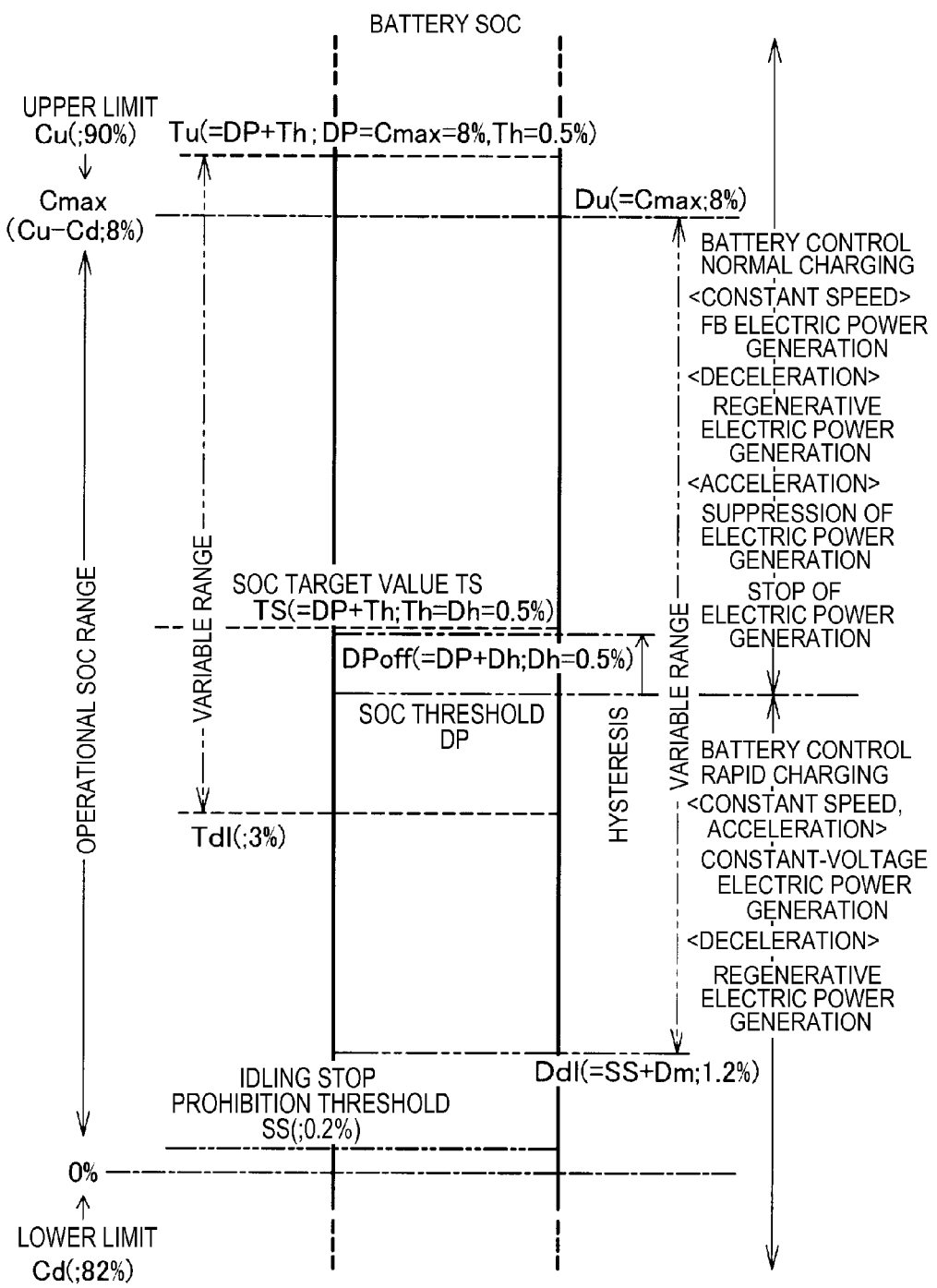
FIG. 7 is an illustrative view showing an SOC threshold and an SOC target value that are obtained in the battery control routine of FIG. 3, and showing a relationship between these values and battery control.

FIG. 7 is an illustrative view showing the SOC threshold DP and the SOC target value TS that are obtained in the battery control routine of FIG. 3 and showing a relationship between these values and battery control. As described above, the SOC range in which the battery 40 can be used (the operational SOC range) is determined as, for example, a range from a lower limit Cd (; 82%) to an upper limit Cu (; 90%) in a total battery capacity (100%). Battery control is designed to control the operation of charging the battery 40 based on the SOC threshold DP and the SOC target value TS, such that the SOC is held within the operational SOC range.

It should be noted herein that the SOC threshold DP is set according to the aforementioned expression (3), based on the estimated consumption current amount PR that is obtained from the auxiliary current amount Ih and the estimated stop time Te, the idling stop prohibition threshold SS, and the correction value CO, as described above. As is apparent from the expression (3), the SOC threshold DP is a value that changes in accordance with the estimated consumption current amount PR, namely, the auxiliary current amount Ih or the estimated stop time Te.

Thus, a lower limit Dd1 of the change in the SOC threshold DP is set in consideration of a margin Dm (e.g., 1%) in addition to the idling stop prohibition threshold SS (e.g., 0.2%) (1.2% in the present example). Besides, an upper limit Du of the change in the SOC threshold DP is set in consideration of an upper limit Cmax (=Cu−Cd; 8%) of the operational SOC range (8% in the present example). Accordingly, in the present example, the variable range of the SOC threshold DP is 1.2%≤DP≤8%.

Besides, as described above, the SOC threshold DP is a threshold for determining whether or not rapid charging (recovery charging) should be carried out to recover the SOC so as to prevent the SOC of the battery 40 from becoming insufficient in the SOC during idling stop at the time of idling stop that is carried out next time. Then, when the value of the SOC of the battery 40 is smaller than the SOC threshold DP, a rapid charging battery control (referred to also as "recovery charging battery control") state is established. When the SOC is equal to or larger than the SOC threshold DP, a normal charging battery control state is established.

In the rapid charging battery control state, in the constant-speed running mode and the acceleration running mode, the alternator 35 is commanded to generate the electric power generation command voltage SV of the voltage value for rapid charging, which is higher than the value of the electric power generation command voltage SV in normal charging battery control that will be described later. The alternator 35 is subjected to constant-voltage electric power generation control so as to generate electric power at the high voltage value for rapid charging, so rapid charging operation is performed. Besides, in the deceleration running mode as well, the alternator 35 is commanded to generate the electric power generation command voltage SV indicating the voltage value for regenerative charging that is higher than the value of the electric power generation command voltage SV in normal charging battery control. The alternator 35 is subjected to regenerative electric power generation control so as to generate electric power at a high voltage value for regenerative charging, so regenerative charging operation is performed. It should be noted, however, that rapid charging battery control that has been started does not end as soon as the SOC of the battery 40 recovers to the SOC threshold DP, but ends as soon as the SOC recovers to an off threshold DPoff that is obtained by adding a hysteresis value Dh (0.5% in the present example) to the SOC threshold DP, with hysteresis characteristics provided such that stable charging operation is performed.

Figure 8:
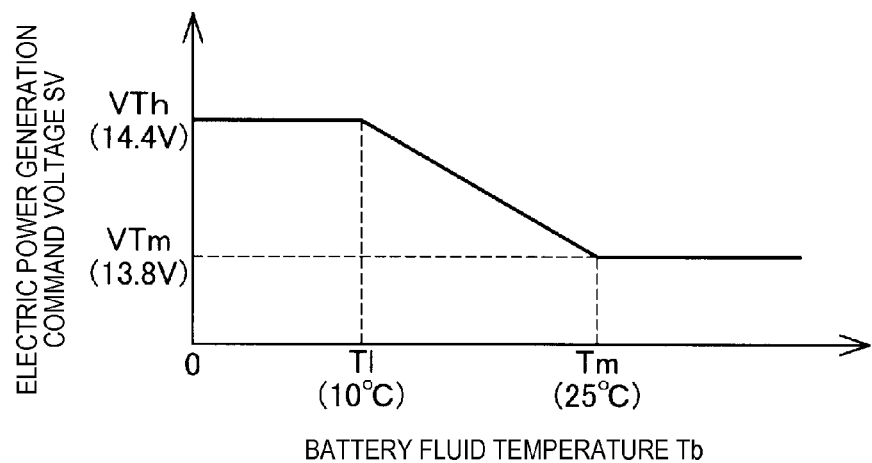
FIG. 8 is an illustrative view showing an example of an electric power generation command voltage for rapid charging.

The electric power generation voltage SV for rapid charging is set as will be described hereinafter. FIG. 8 is an illustrative view showing an example of the electric power generation command voltage SV for rapid charging. The electric power generation command voltage SV for rapid charging is a value corresponding to a battery fluid temperature (hereinafter referred to simply as "a battery temperature") Tb. Specifically, as shown in FIG. 8, when the battery temperature Tb is equal to or higher than a steady temperature Tm (13.8 V in the present example), the electric power generation command voltage SV for rapid charging is a first high voltage VTm for rapid charging (13.8 V in the present example). Then, when the battery temperature Tb is equal to or lower than a low temperature T1 (<Tm, e.g., 10° C.), the electric power generation command voltage SV for rapid charging is a second high voltage VTh (e.g., 14.4 V) that is higher than the first high voltage. When 10<Tb<25, the electric power generation command voltage SV for rapid charging is a value that sequentially rises from the first high voltage VTm to the second high voltage VTh as the temperature drops. That is, the electric power generation command voltage SV for rapid charging is set as a certain constant voltage value from the first high voltage VTm to the second high voltage VTh, in accordance with the battery temperature Tb.

The battery 40 has characteristics of deteriorating in acceptability as the battery temperature Tb drops. Incidentally, "the acceptability" is an index indicating the easiness with which the battery is charged. Thus, with a view to allowing the battery 40 to be rapidly and sufficiently charged even in a state where the battery temperature Tb is low, the charging voltage for the battery is enhanced by increasing the electric power generation command voltage SV as the battery temperature Tb drops. Incidentally, the life of the battery tends to shorten when the charging voltage for the battery is enhanced. On the other hand, the life of the battery tends to lengthen as the battery temperature drops. Therefore, a decrease in the life of the battery can be restrained from being influenced even when the electric power generation command voltage SV is enhanced as the battery temperature drops.

The electric power generation command voltage SV for regenerative charging is set as will be described hereinafter. That is, regenerative charging operation is performed in the deceleration running mode, and this operation lasts for a shorter time than other charging operations. Therefore, the influence on the life of the battery is considered to be weak even when the charging voltage is enhanced. Thus, in the present example, the electric power generation command voltage SV for regenerative charging is set to a third high voltage VTr (14.8 V in the present example) that is higher than the second high voltage VTh (e.g., 14.4 V) as the electric power generation command voltage SV for rapid charging.

By contrast, in the normal charging battery control state, as will be described hereinafter, charging operation through FB electric power generation control is performed such that the SOC is held equal to the SOC target value TS (FIG. 7) in the constant-speed running mode. Besides, in the deceleration running mode, as is the case with the rapid charging battery control state, charging operation through regenerative electric power generation control is performed. It should be noted, however, that importance is attached to the acceleration performance in the acceleration running mode, and that the alternator 35 is restrained or stopped from generating electric power.

Figure 9:
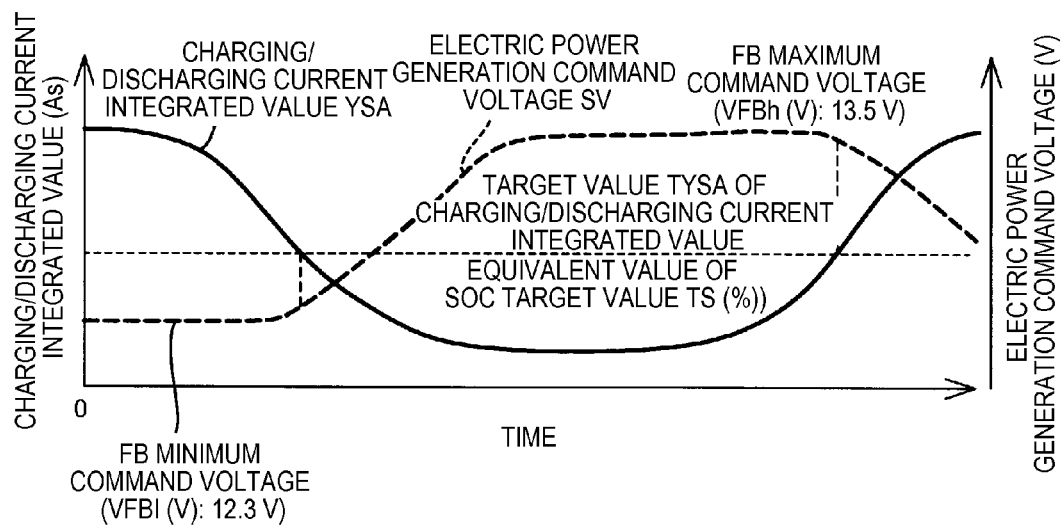
FIG. 9 is a timing chart showing an electric power generation command voltage during FB electric power generation control in a constant-speed running mode in a normal battery control state.

FIG. 9 is a timing chart showing the electric power generation command voltage through FB electric power generation control in the constant-speed running mode in the normal battery control state. In FB electric power generation control, the electric power generation command voltage SV is subjected to feedback control such that a charging/discharging current integrated value YSA (As) becomes equal to a target value TYSA (As) of the charging/discharging current integrated value. Incidentally, the target value TYSA is a value that is obtained by converting the SOC target value TS (%) into the charging/discharging integrated value (As) according to, for example, an expression (5) shown below, on the assumption that the state where the SOC is 100% is equal to the 5 hour ratio capacity (As) of the battery.

$$TYSA(As)=(5 \text{ hour ratio capacity})(As) \times TS(\%)/100 \quad (5)$$

Specifically, as shown in FIG. 9, in a state where the charging/discharging current integrated value YSA is larger than the target value TYSA, electric power generation is suppressed by reducing the electric power generation command voltage SV to an FB minimum electric power generation command voltage VFB1 (V) (12.3 V in the present example) in accordance with the difference between the charging/discharging current integrated value YSA and the target value TYSA. By contrast, in the state where the charging/discharging current integrated value YSA is smaller than the target value TYSA, electric power generation is promoted by increasing the electric power generation command voltage SV to an FB maximum electric power generation command voltage VFBh (V) (13.5 V in the present example) in accordance with the difference between the charging/discharging current integrated value YSA and the target value TYSA. In this manner, the electric power generation command voltage SV is subjected to feedback control such that the charging/discharging current integrated value YSA (As) becomes equal to the target value TYSA (As) of the charging/discharging current integrated value, so the SOC of the battery 40 is controlled to be held equal to the SOC target value TS.

As described above, the SOC target value TS shown in FIG. 7 is a value (the expression (4)) that is obtained by adding the margin Th (%), which is taken into account to prevent the SOC of the battery 40 from becoming equal to or smaller than the SOC threshold DP, to the SOC threshold DP (the expression (3)).

It should be noted herein that when the estimated consumption current amount PR is small and the load applied to the battery 40 is low in the case where the auxiliary current amount Ih is small, where the estimated stop time Te is short, etc., the SOC of the battery 40 can be sufficiently held equal to the SOC target value TS instead of becoming equal to or smaller than the SOC threshold DP, according to charging operation through FB electric power generation control in the constant-speed running mode in the normal charging operation state and regenerative electric power generation control in the deceleration running mode. Thus, the margin Th may be basically set at least equal to the hysteresis value Dh corresponding to an end value of rapid charging operation. In the present example, the margin Th is set equal to Dh=0.5%.

It should be noted, however, that when the load applied to the battery 40 becomes high, for example, in the case where the auxiliary current amount Ih increases or the estimated stop time Te lengthens etc., the SOC target value TS may not allow charging to be carried out in time and the SOC may become equal to or smaller than the idling stop prohibition threshold SS if the SOC threshold DP assumes a certain value. Thus, with a view to preventing the SOC from becoming at least equal to or smaller than the idling stop prohibition threshold SS even in the event of a sudden transition to a high load state, a lower limit Td1 (%) is set as the SOC target value TS. In the present example, the lower limit Td1 of the SOC target value TS is set to 3%. That is, when the SOC threshold DP is equal to or lower than 2.5%, the SOC target value TS is set to 3% regardless of the expression (4).

Figure 10A:
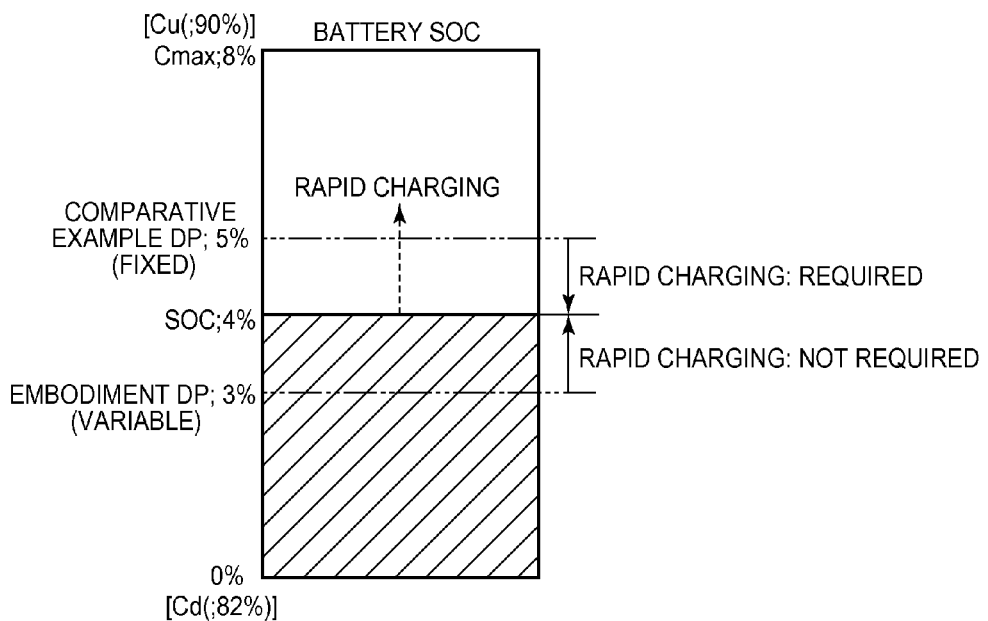
FIG. 10A is an illustrative view showing an effect according to which an SOC threshold is variably set in accordance with an estimated consumption current amount that is obtained based on an estimated stop time and an auxiliary current amount.

FIG. 10 is an illustrative view showing an effect according to which the SOC threshold DP is variably set in accordance with the estimated consumption current amount PR that is obtained from the estimated stop time Te and the auxiliary current amount Ih. As shown in FIG. 10A, it is assumed that the SOC of the battery 40 is 4%, and that the SOC threshold DP as a comparative example is fixed to 5%. In this case, the SOC (4%) is lower than the SOC threshold DP (5%), so rapid charging is required to establish the rapid charging battery control state. Rapid charging is carried out such that the state of the SOC becomes equal to or larger than the SOC threshold DP. By contrast, in the present embodiment of the invention, if the SOC corresponding to the estimated consumption current amount PR is about 3%, the SOC is variably set to the SOC threshold DP (3%) corresponding thereto. The SOC (4%) becomes higher than the SOC threshold DP (3%) that is variably set. Therefore, rapid charging becomes unnecessary, rapid charging operation is avoided, and charging operation can be restrained from being performed beyond necessity.

Figure 10B:
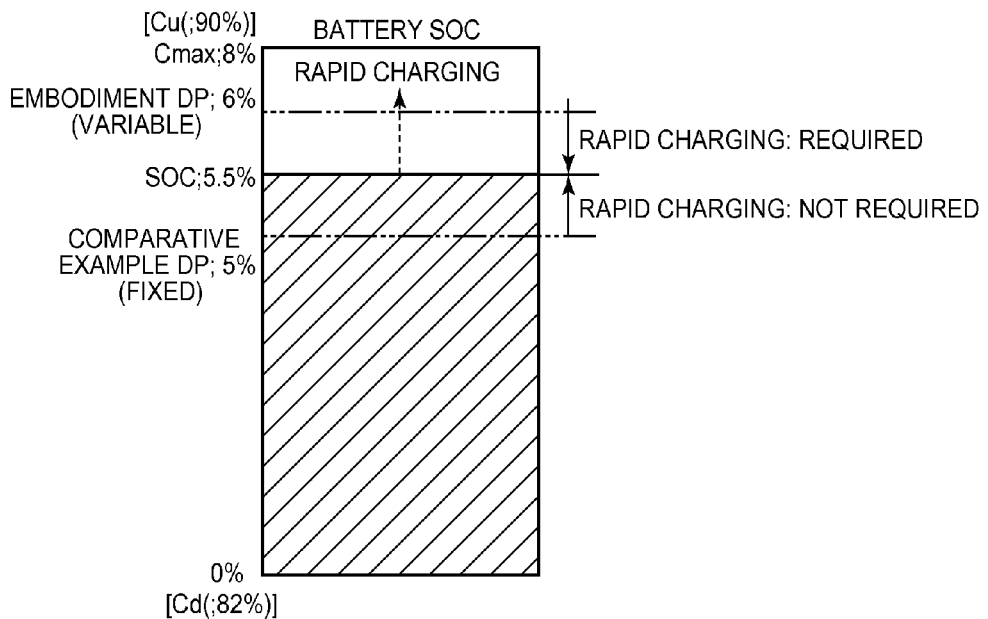
FIG. 10B is an illustrative view showing an effect according to which the SOC threshold is variably set in accordance with the estimated consumption current amount that is obtained based on the estimated stop time and the auxiliary current amount.

Besides, as shown in FIG. 10B, it is assumed that the SOC of the battery is 5.5%, and that the SOC threshold DP as a comparative example is fixed to 5% as is the case with FIG. 10A. In this case, the SOC (5.5%) is higher than the SOC threshold DP (5%), so rapid charging is not required. Therefore, rapid charging operation is not performed. However, in this case, if the SOC corresponding to the estimated consumption current amount PR is higher than 5%, for example, if the SOC equal to about 6% is required, the SOC may become insufficient during the execution of idling stop, and idling stop may be suspended. By contrast, in the present embodiment of the invention, the SOC threshold DP (6%) corresponding to the estimated consumption current amount PR is variably set, and the SOC (5.5%) becomes lower than the variably set SOC threshold DP (6%). Therefore, rapid charging is required to establish the rapid charging battery control state. Rapid charging is carried out such that the state of the SOC becomes equal to or larger than the SOC threshold DP. Thus, idling stop can be restrained from being forcibly canceled in mid-course.

As described above, in the present embodiment of the invention, the SOC threshold DP is variably set in accordance with the estimated consumption current amount PR that is obtained from the estimated stop time Te and the auxiliary current amount Ih. Thus, the possibility of idling stop being forcibly canceled in mid-course, the possibility of the battery being changed with an amount of electricity beyond necessity, and the like are suppressed, so the performance of fuel economy can be enhanced.

The invention should not be limited to the aforementioned embodiment thereof. The invention can be realized in various configurations without departing from the gist thereof. For example, the technical features of the embodiment of the invention that correspond to the technical features in the respective aspects described in the section of the summary of the invention can be appropriately replaced or combined to partially or entirely solve the aforementioned problem or to partially or entirely achieve the aforementioned effect. Besides, the technical features can be appropriately removed unless described as indispensable in the present specification.

What is claimed is:

1. A vehicle control apparatus that is mounted in a vehicle having an engine, a generator that is driven by a power of the engine, a battery that can be charged through electric power generation by the generator, and an auxiliary that operates by an electric power stored in the battery, comprising:
    an auxiliary current amount calculation unit that calculates an auxiliary current amount that is used in the auxiliary;
    a stop time ratio calculation unit that calculates a stop time ratio of the vehicle based on a running history of the vehicle;
    a stop time calculation unit that calculates an estimated stop time of the vehicle that is estimated based on the stop time ratio;
    an SOC threshold setting unit that sets an SOC threshold based on an estimated consumption current amount that is obtained from the estimated stop time and the auxiliary current amount; and
    an electric power generation control unit that operates the generator such that a value of a storage state of the battery recovers to become larger than the SOC threshold when the value of the storage state of the battery is smaller than the SOC threshold.

2. The vehicle control apparatus according to claim 1, wherein
    the threshold setting unit makes a comparison between the value of the storage state of the battery at the time of setting the SOC threshold and the value of the storage state of the battery that is obtained a certain time before a present, and corrects the SOC threshold with a correction amount corresponding to a result of the comparison based on a relationship prepared in advance between a change in the value of the storage state of the battery and the correction amount.

3. The vehicle control apparatus according to claim 1, wherein
    the stop time ratio calculation unit sequentially calculates, after a lapse of a first time from a starting point that is a predetermined timing, as a first stop time ratio, a ratio of a stop time to a period of the first time in the past, based on a running history of the vehicle,
    the stop time ratio calculation unit sequentially calculates, after a lapse of a second time from the starting point, as a second stop time ratio, a ratio of a stop time to a period of the second time in the past that is longer than the first time,
    the stop time calculation unit obtains a first estimated stop time corresponding to the first stop time ratio that is calculated by the stop time ratio calculation unit, based on a relationship prepared in advance between the first stop time ratio and the first estimated stop time, and
    the stop time calculation unit obtains a second estimated stop time corresponding to the second stop time ratio that is calculated by the stop time ratio calculation unit, based on a relationship prepared in advance between the second stop ratio and the second estimated stop time, and sets a longer one of the obtained first estimated stop time and the obtained second estimated stop time as the estimated stop time.

4. A vehicle comprising:
    an engine;
    a generator that is driven by a power of the engine;
    a battery that can be charged through electric power generation by the generator;
    an auxiliary that operates by an electric power stored in the battery;
    an auxiliary current amount calculation unit that calculates an auxiliary current amount that is used in the auxiliary;
    a stop time ratio calculation unit that calculates a stop time ratio of the vehicle based on a running history of the vehicle;
    a stop time calculation unit that calculates an estimated stop time of the vehicle that is estimated based on the stop time ratio;
    an SOC threshold setting unit that sets an SOC threshold based on an estimated consumption current amount that is obtained from the estimated stop time and the auxiliary current amount; and
    an electric power generation control unit that operates the generator such that a value of a storage state of the battery recovers to become larger than the SOC threshold when the value of the storage state of the battery is smaller than the SOC threshold.

5. A vehicle control method for controlling a vehicle having an engine, a generator that is driven by a power of the engine, a battery that can be charged through electric power generation by the generator, and an auxiliary that operates by an electric power stored in the battery, comprising:
    calculating an auxiliary current amount that is used in the auxiliary;
    calculating a stop time ratio of the vehicle based on a running history of the vehicle;
    deriving an estimated stop time of the vehicle that is estimated based on the stop time ratio;
    setting an SOC threshold based on an estimated consumption current amount that is obtained from the estimated stop time and the auxiliary current amount; and
    operating the generator such that a value of a storage state of the battery recovers to become larger than the SOC threshold when the value of the storage state of the battery is smaller than the SOC threshold.

* * * * *